United States Patent [19]

Takimoto et al.

[11] 4,400,743
[45] Aug. 23, 1983

[54] VIDEO CAMERA AND RECORDER

[75] Inventors: Hiroyuki Takimoto, Yokohama; Tatsuzo Ushiro, Tokyo, both of Japan

[73] Assignee: Canon Kabushiki Kaisha, Tokyo, Japan

[21] Appl. No.: 221,787

[22] Filed: Dec. 31, 1980

[30] Foreign Application Priority Data

Jan. 16, 1980 [JP] Japan .............................. 55-3142[U]

[51] Int. Cl.³ .............................................. H04N 5/91
[52] U.S. Cl. .................................... 358/335; 358/906
[58] Field of Search ................. 358/50, 209, 217, 127, 358/41, 44, 45, 227, 335, 310, 311, 906; 360/33, 35, 79, 14, 14.1, 14.2, 14.3, 35.1, 33.1

[56] References Cited

U.S. PATENT DOCUMENTS 3,974,522 8/1976 Fukatsu et al. ........................ 360/14
4,131,919 12/1978 Lloyd et al. ..................... 358/127 X
4,163,256 7/1979 Adcock .............................. 358/127

Primary Examiner—Bernard Konick
Assistant Examiner—Donald McElheny, Jr.
Attorney, Agent, or Firm—Fitzpatrick, Cella, Harper & Scinto

[57] ABSTRACT

A video camera for use in combination with a video recorder and having an automatic focusing device for automatically focusing a picture-taking lens to an object, trigger means to be manually actuated from outside, and a recorder trigger circuit means receiving a signal indicating the completion of focusing of the lens supplied from the automatic focusing device and a signal indicating the actuation of the trigger means and adapted to release a recording start signal to the video recorder in response to the actuation of the trigger means and to the completion of the focusing of the picture-taking lens.

18 Claims, 9 Drawing Figures

VIDEO CAMERA AND RECORDER

BACKGROUND OF THE INVENTION

1. Field of the Invention

The present invention relates to a video camera, and more particularly to a video camera for use in combination with a video recorder.

2. Description of the Prior Art

Video recording systems utilizing the combination of a video camera and a video recorder have become ever more popular in recent years.

Among such systems, most of the compact video recording system utilizing cassette-type video tape recorders are so structured that the electric circuits in the video camera are powered by a power source in the recorder or an external power source and the recorder is brought to a stand-by state for recording when the camera is connected to the recorder or when a power supply button or a recording button on the recorder is actuated after it is connected to the camera, and that, in response to the actuation of a trigger button on the camera in this state, the camera releases a recording start signal to the recorder to initiate the function thereof, thus recording the video output signal from the camera on the magnetic tape in the recorder.

Such power supply to the camera circuits initiated simultaneously with the stand-by state of the recorder is adopted for enabling recording to start at any moment, in consideration of the fact that the imaging tube employed in the video camera requires a relatively long pre-heating time, generally in the order of 30 seconds from commencement of power supply, before reaching a stable function state.

On the other hand, the automatic focusing of the picture-taking lens is being introduced into the photographic still cameras and 8 mm movie cameras, and is being actively investigated for application also in the video cameras. However such automatic focusing device, if introduced into the video recording system as explained in the foregoing, will encounter certain difficulties. Because of the photoelectric detector means generally employed in the automatic focusing devices, the period required for accurately focusing the lens to the object significantly depends on the picture taking conditions, particularly the conditions of the object, and becomes considerably long when the conditions of the object are not favorable. Consequently, if such automatic focusing device is incorporated in the video camera, the initial portion of a scene will tend to be deteriorated since a certain period will be required for focusing the lens to the object after the trigger button is actuated for taking the scene.

SUMMARY OF THE INVENTION

The object of the present invention is to provide an improved video camera not associated with the above-mentioned drawback of image deterioration in the initial portion of each scene encountered in the use of the automatic focusing device and capable of constantly providing a satisfactory image from the beginning of each operation.

The above-mentioned object is achieved according to the present invention by a video camera for use in combination with a video recorder and provided with an automatic focusing device for automatically focusing a picture-taking lens to an object, trigger means to be manually actuated from outside and recorder trigger circuit means receiving a signal indicating the completion of lens focusing supplied from said automatic focusing device and a signal indicating the actuation of said trigger means and adapted to release a recording start signal to said video recorder in response to the actuation of said trigger means and to the completion of the focusing of the picture-taking lens.

Besides, in the preferred embodiments of the present invention to be explained later, there will be disclosed camera structures in which said automatic focusing device is activated by the actuation of said trigger means, or said trigger means comprises first and second trigger switches to be manually actuated in succession from the outside, said first switch being adapted to activate said automatic focusing device singly or in combination with other camera circuits while said second switch is adapted to release a signal to said recorder trigger circuit means, or said second trigger switch activates said automatic focusing device and releases a signal to said recorder trigger circuit means while other camera circuits are activated by the preceding actuation of said first trigger switch, and such structures are particularly advantageous in avoiding a drawback of continuous function state of the automatic focusing device when the recorder is brough to the stand-by state after it is connected to the camera, and in reducing the electric power loss in the camera.

On the other hand, said automatic focusing device is preferably so structured as to allow manual focusing of the picture-taking lens when desired, and for this purpose, in another preferred embodiment to be explained later, the recording start signal to the recorder is obtained solely by the actuation of said trigger means in case the camera is used with the automatic focusing device in the inactive state.

Also as explained in the foregoing, the imaging tube employed as the image-taking means of the camera requires a relatively long warm-up time from the start of power supply before allowing proper imaging, so that the image in the initial portion of a scene is deteriorated if the imaging is started immediately after the imaging tube is powered. In order to avoid such drawback, in still another embodiment of the present invention, there are provided detecting mleans for detecting whether the imaging tube has reached the stationary function state and releasing a signal upon reaching said state, said signal being supplied to said recorder trigger circuit means together with the signal from said automatic focusing device and that from said trigger means whereby the recording start signal is supplied from said recorder trigger circuit means to the video recorder only under the conditions that said imaging tube is in the stationary function state, that said trigger means has been actuated and that the lens focusing has been completed.

Still other objects and advantages of the present invention will become apparent from the following description of the embodiments thereof to be taken in conjuction with the attached drawings.

DESCRIPTION OF THE PREFERRED EMBODIMENTS

Now the present invention will be clarified in detail by the following description of the preferred embodiments thereof to be taken in conjunction with the attached drawings.

Figure 1:
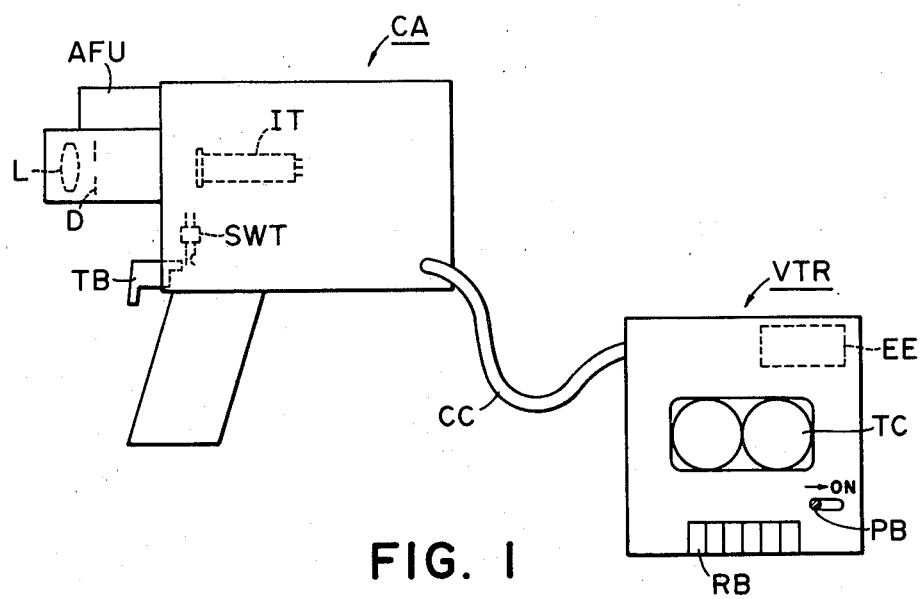
FIG. 1 is a schematic view of an embodiment of the video recording system composed of a video camera of the present invention and a cassette video tape recorder.

FIG. 1 shows an embodiment of the video recording system composed of a video camera of the present invention and a cassette video tape recorder, in which the video camera CA is connected to the video tape recorder VTR through a connecting cable CC through which the camera CA is powered by a power source EE provided in said recorder VTR, and also through which there are supplied from the camera CA to the recorder VTR a video signal and a recording start signal for triggering the recorder obtained by the circuitry to be explained in the following.

The image recording with the above-mentioned is performed in the following manner. Upon connection of the camera CA with the recorder VTR through the cable CC or upon actuation of a power supply button PB after said connection is made, all the electric circuits in the camera CA are powered by the power source EE in the recorder VTR whereby the heating of an imaging tube IT is initiated and an automatic focusing unit AFU is activated together with other circuits in the camera. Then in response to the actuation of a recording button RB provided in the recorder VTR, the signal recording system is loaded with the video tape housed in a tape cassette TC and is brought to a function state by starting the motors for driving the recording head cylinder and capstan and by supplying power to the various circuits. In a recorder in which the video tape is already loaded to the signal recording system at the mounting of the tape cassette on the recorder, the signal recording system alone is shifted to the function state in response to said actuation. In this state the tape drive system of the recorder VTR is still not activated whereby the video tape is maintained at a standstill. Such preparatory state for image recording is called the stand-by state of the recorder.

Upon completion of the warming-up, the imaging tube IT of the camera initiates release of the video signal therefrom to said signal recording system through the cable CC. By aiming the camera CA to a desired object, a picturetaking lens L is automatically focused thereto by means of the automatic focusing unit AFU. Then upon closing a trigger switch SWT by the actuation of a trigger button TB, a recorder trigger circuit provided in the camera CA according to the present invention releases, under the conditions of closing of said trigger switch SWT and of completion of lens focusing to the object, a recording starting signal which is supplied through the cable CC to the recorder VTR to activate the tape drive system for example, by pressing a pinch roller against a capstan across the video tape and initiating the function of a tape take-up reel, thereby recording the video signal from the camera CA on the video tape.

Now the present invention outlined in the foregoing will be explained further by a specific embodiment thereof.

Figure 2:
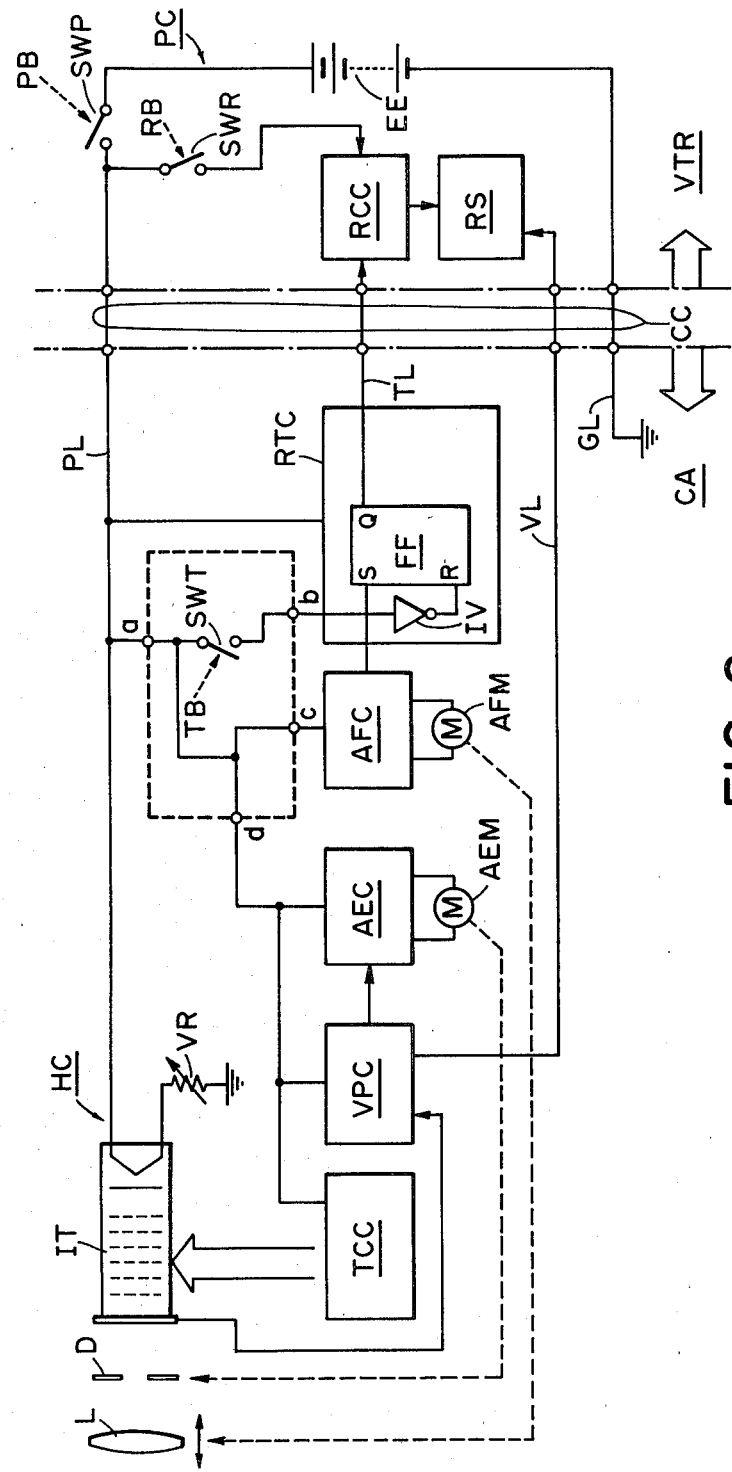
FIG. 2 is a block diagram of an essential part relating to the present invention of the electric circuits of the video recording system shown in FIG. 1 in a state in which the camera is connected to the video recorder.

Referring to FIG. 2, the camera CA is provided with a heater circuit HC for the imaging tube IT, a variable resistor VR for voltage regulation, a known tube control circuit TCC including—high-voltage generating circuit, a deflection circuit, etc., a known video process circuit VPC for forming a standard video signal from the scanning signal from the imaging tube IT, a known automatic exposure control circuit AEC for generating a signal for controlling a diaphragm D in response to a luminance (Y) signal from said video process circuit VPC, and an automatic focusing circuit AFC provided in said automatic focusing unit AFU and adapted to generate a signal for focusing the lens L, said circuits being connected to a power supply line PL in the camera CA so that they are powered by a power source EE in the recorder VTR through the cable CC when a power switch SWP is closed by the actuation of the power supply button PB. The video signal supplied from said video process circuit BFC is introduced, through a video signal output line VL and the cable CC, into the signal recording system RS of a known structure provided in the recorder VTR. Also there are shown an automatic exposure control motor AME for driving the diaphragm D in response to the output signal from said automatic exposure control circuit AEC, and an automatic focusing motor AFM for driving the lens L in said automatic focusing unit AFU in response to the output signal from said automatic focusing circuit AFC. Further there is provided a recorder trigger circuit RTC adapted for receiving the actuation signal of the trigger switch SWT and a signal from the automatic focusing circuit AFC indicating the completion of lens focusing and releasing a recording start signal for triggering the recorder under the conditions that the trigger switch SWT is actuated and the lens L is focused. Said recorder trigger circuit is composed of an inverter IV connected to the trigger switch SWT and a reset-preferential R-S flip-flop FF receiving the output signal from said inverter IV at the reset input port R and the focusing completion signal from said automatic focusing circuit AFC at the set input port S and releasing an output signal Q as said recorder trigger signal, through said trigger signal output line TL and the cable CC to a signal recording system control circuit RCC of a known structure in the recorder VTR. Said trigger switch SWT is a normally open switch to be closed in response to the actuation of the trigger button TB and is connected to the power supply line PL as shown in FIG. 2, so that the signal supplied from said trigger switch SWT to the recorder trigger circuit RTC is at a high level or a low level, respectively, whether the trigger button TB is actuated or not. The automatic focusing circuit AFC can be constructed in various manners but is preferably so structured as to release a high-level signal for stopping the motor AFM at the completion of the lens focusing to the object, said high-level signal being supplied as the focusing completion signal to the recorder trigger circuit RTC. More specifically, said automatic focusing circuit AFC can be of a structure as disclosed in U.S. patent application Ser. No. 121,690 filed Feb. 15, 1980 and assigned to the assignee of the present application, wherein a high-level signal released for stopping the automatic focusing motor when the lens L is focused to the object is supplied as the focusing completion signal to the recorder trigger circuit RTC. In the illustrated embodiment a high level output O from the flip-flop FF is used as the trigger signal to the recorder VTR.

In the camera CA, GL indicates a ground connecting line.

In the recorder VTR, there are provided a power supply circuit PC comprising a power supply EE and a power switch SWP, and a recording switch SWR to be actuated by a recording button RB. The aforementioned signal recording system control circuit RCC is adapted, in response to the actuation of the recording switch SWR after the actuation of the power switch SWP, to cause the signal recording system RS to perform all necessary functions for signal recording other than the tape drive, for example the functions of tape loading, activation of the head cylinder motor, capstan motor and various circuits, and, in response to the trigger signal from the camera CA, to cause said recording system RS to perform the tape drive functions, by biasing the pinch roller against the capstan and connecting a clutch for the tape take-up reel. Such control circuit RCC is however already known in the art and will not therefore be discussed in detail.

In such video recording system composed of the video camera CA and the tape recorder VTR connected through the cable CC as explained in the foregoing, the power line PL and the grounding line GL of the camera CA are connected to the power supply circuit PC having the power supply EE and the power switch SWP in the recorder VTR, and the video signal output line VL and the trigger signal output line TL of the camera CA are respectively connected to the signal recording system RS and the signal recording system control circuit RRC in the recorder VTR, through suitable lines provided in the cable CC. Upon closing of said power switch SWP by the power supply button PB on the recorder VTR, the camera circuits HC, TCC, VPC, AEC, AFC and RTC are powered by said power supply EE to render the camera CA operable. On the other hand, in the recorder VTR, in response to the subsequent closing of the recording switch SWR by the recording button RB, said recording system control circuit RCC is activated to shift the recording system to the aforementioned operable state, thus setting the recorder VTR in the aforementioned standby state. Then, in response to the actuation of the trigger button TB after the camera CA is aimed at the desired object, the trigger switch SWT is closed to release a high-level signal, whereby the inverter IV in the recorder trigger circuit RTC releases a low-level signal to release the flip-flop FF from the reset state. Thus, if the set input signal S from the automatic focusing circuit AFC to the flip-flop FF is already in the high-level state, indicating the completion of the lens focusing to the object, or when said input signal S is thereafter shifted to the high-level state in response to the completion of the lens focusing, the flip-flop FF is accordingly set to release the high-level output signal Q, which is supplied as the recorder trigger signal to the recording system control circuit RRC of the recorder VTR through the output line TL and the cable CC. Thus said control circuit RCC causes the signal recording system RS to initiate the tape drive, thus starting the recording of video signal from the video process circuit VPC in the camera CA on said video tape in the recorder VTR.

As explained in the foregoing, the recording start signal in the embodiment shown in FIG. 2 is supplied from the camera CA to the recorder VTR.

Figure 3A:
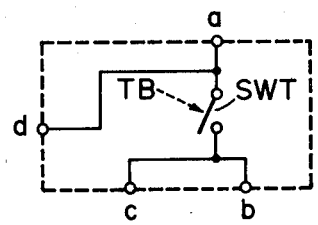
FIGS. 3A to 3D are partial circuit diagrams showing four variations of the trigger unit in the camera shown in FIG. 2.

In said embodiment the automatic focusing circuit AFC is directly connected to the power line PL and is therefore maintained continuously operable together with other camera circuits when the camera CA is connected to the recorder VTR and the recording button RB thereof is actuated. The eventual troubles resulting from such structure can however be resolved by replacing a brokenlined circuit block shown in FIG. 2 by circuits shown in FIGS. 3A to 3D. In a variation shown in FIG. 3A, the power supply line to said automatic focusing circuit AFC is connected through said trigger switch SWT to the power line PL, whereby the automatic focusing unit AFU is activated when the trigger switch SWT is closed. In a variation shown in FIG. 3B, the trigger button TB closes first and second trigger switches SWT1, SWT2 in succession, wherein the automatic focusing unit AFU is activated by said first trigger switch SWT1 while the recorder trigger circuit RTC is activated by said second trigger switch SWT2.

Figure 3B:
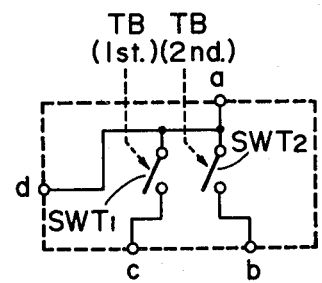
Figure 3C:
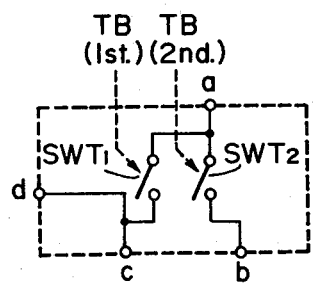
Figure 3D:
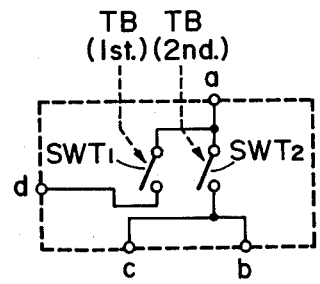

In an embodiment shown in FIG. 3C, constituting a variation to the circuit shown in FIG. 3B, the automatic focusing unit AFU is activated by the first trigger switch SWT1 together with other camera circuits TCC, VPC, AEC, etc. but excluding the heater circuit HC. Also in a variation shown in FIG. 3D, said other camera circuits TCC, VPC, AEC, etc. excluding the heater circuit HC are activated by said first trigger switch SWT1 while the automatic focusing unit AFU is activated by said second trigger switch SWT2. Thus the embodiments shown in FIGS. 3A and 3B allow economy of power consumption by the automatic focusing unit AFU even in a state in which the power switch SWP is closed by the power supply button PB after the camera CA is connected to the recorder VTR, while the embodiments shown in FIGS. 3C and 3D provide a significant power economization for the camera circuits other than the heater circuit HC.

In the foregoing embodiment the automatic focusing unit AFU is maintained continuously operable during the image recording by the camera CA, but it is often preferable to render the automatic focusing unit AFU selectively operable in order to allow the operator manual focusing of the lens L. Such objective is achieved in two variations shown in FIG. 4.

Figure 4A:
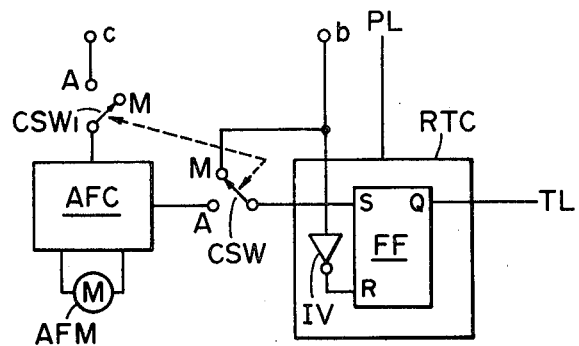
FIGS. 4A and 4B are partial circuit diagrams showing two variations in a part of camera circuits shown in FIG. 2.
Figure 4B:
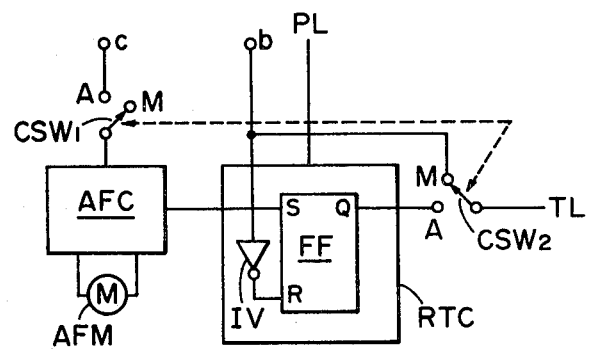

In FIGS. 4A and 4B, a first selector switch CSW1 is provided between the automatic focusing circuit AFC and a terminal C for enabling or disabling said circuit, wherein said switch is provided with a terminal A connected to said terminal C and an open terminal C, respectively for enabling said automatic focusing circuit AFC and disabling said circuit for manual focusing mode. Said selector switch CSW1 is so positioned as to be operable from the outside of the camera CA. There is also provided a second selector switch CSW2 so linked with said first selector switch CSW1 that said switches simultaneously are connected to terminals A or M. In the embodiment shown in FIG. 4A the selector switch CSW2 is provided between the output of the automatic focusing circuit AFC and the input for the recorder trigger circuit RTC, with the terminals A and M respectively connected to the output terminal of said circuit AFC and to the aforementioned terminal b, while in the embodiment shown in FIG. 4B said selector switch CSW2 is provided after the recorder trigger circuit RTC with the terminals A and M respectively connected to the output terminal of said circuit RTC and to said terminal b. In the above-mentioned two embodiments, the recording with automatic focusing unit AFU in operable state is achieved when said switches CSW1, CSW2 are positioned at the terminals A thereof whereby the recording function by the recorder VTR is initiated under the conditions of completion of lens focusing and of actuation of the trigger switch SWT (in case of FIG. 2 or FIG. 3A) or the trigger switch SWT2 (in case of FIG. 3B, 3C or 3D) in the same manner as explained in the foregoing, whereas the recording without the automatic focusing is achieved when said switches CSW1, CSW2 are positioned at the terminals M thereof whereby the recorder VTR can be started solely by the actuation of the trigger switch SWT (in case of FIG. 2 or 3A) or the trigger switch SWT2 (in case of FIGS. 3B, 3C or 3D). The embodiment shown in FIG. 4A is different from that of FIG. 4B in that the recording start signal in the former is released from the recorder trigger circuit RTC in response to the actuation of the trigger switch SWT or SWT2 while said signal in the latter is directly supplied to the output line TL from the trigger switch SWT or SWT2.

As already well known the imaging tube IT employed in the foregoing embodiments as the image-taking means requires a relatively long warm-up time, in the order of 10 seconds for example, from the start of power supply to a stably operable state capable of releasing proper scanning signal. For this reason, if the recording is initiated immediately after the start of power supply, the proper image recording can only be made after such warm-up time so that the initial portion of a continuous scene may be extremely deteriorated in image quality. Such trouble can however be avoided by a modification shown in FIG. 5.

Figure 5:
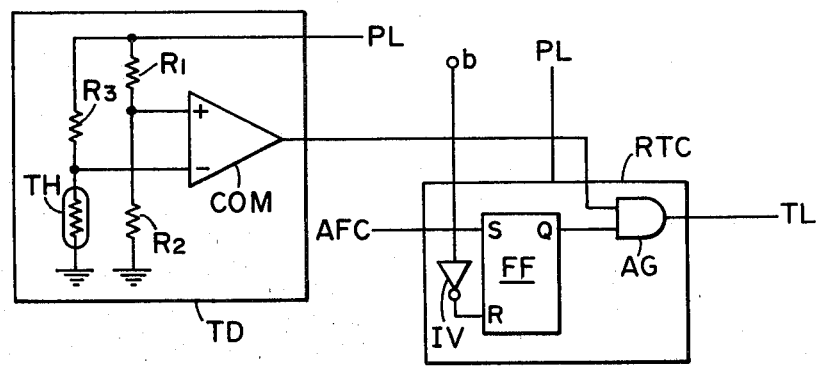
FIG. 5 is a partial circuit diagram showing another variation in a part of the camera circuits shown in FIG. 2.

In FIG. 5 there is provided a detecting circuit TD for identifying whether the imaging tube IT has reached the determined stable state. In the illustrated embodiment said circuit TD is designed to detect whether the imaging tube has been sufficiently warmed up, by means of a thermister TH so positioned in the vicinity of the imaging tube IT, preferably in the vicinity of the heater circuit HC therefore, as to change the resistance in response to the warm-up state of said imaging tube IT. A dividing resistor R3 constitutes, with said thermister TH, a serial voltage-dividing circuit connected to said power supply line PL, and the voltage-dividing point of said circuit is connected to the inverted input terminal of a comparator COM. Also resistors R1, R2 constitute another voltage-dividing circuit connected to said power supply line PL, and the voltage-dividing point thereof is connected to the uninverted input terminal of said comparator COM. Said thermister TH decreases the resistance with the increase in ambient temperature, and said resistors R1, R2 are so selected as to provide a divided voltage substantially equal to the divided voltage obtained by the resistor R3 and the thermister TH when the imaging tube IT is heated sufficiently to release a proper image scan signal, thus providing a standard level for identifying whether the imaging tube IT has reached a stable state. Said comparator COM provides a low-level signal when the imaging tube IT is not in the stable state, and a high-level signal when the imaging tube IT reaches the stable state.

On the other hand the recorder trigger circuit RTC is provided with an AND gate AG for releasing a high-level signal in response to the high-level signals received from the flip-flop FF and from said detecting circuit TD, whereby said high-level signal from the gate AG is supplied as the recording start signal to the output line TL.

In this manner, in the embodiment shown in FIG. 5, the recording function by the recorder VTR is initiated under the conditions that the imaging tube reaches the stable state, that said trigger switch SWT or SWT2 is actuated and that focusing of lens L is completed.

Naturally the embodiment shown in FIG. 5 may be further combined with the modifications shown in FIGS. 4A and 4B. For example the circuit shown in FIG. 4A can be simply combined with the circuit shown in FIG. 5, and that shown in FIG. 4B can be combined with that in FIG. 5 by placing the gate AG in FIG. 5 after the second selector switch CSW2 in FIG. 4B.

Thus in the manual focusing in the embodiments shown in FIGS. 4A and 4B, it is preferable, simultaneously with the changeover of the selector switches CSW1, CSW2 from the positions A to M, to disconnect the focusing motor AFM and the lens L from the focusing mechanism in order to enable focusing with a little effort. It is also possible to insert a friction clutch in the power transmission mechanism connected to said focusing motor AFM.

In further connection with the embodiment shown in FIG. 5, the stable state of the imaging tube IT can also be identified by the output level thereof or the output level of the video process circuit VPC or even by certain other direct methods, so that it will be understood that the present invention is by no means limited to the foregoing embodiments.

What we claim is:

1. A video camera for use with a video recorder having means for recording video signals on a recording medium and being operable to start the recording operation in response to a start signal provided by the camera, said camera comprising:
    a focus adjustable image pick-up lens system;
    an automatic focusing device for automatically adjusting the focus of said lens system onto an object, said focusing device producing a characteristic output upon completion of the focusing of the lens system onto the object;
    trigger means operable manually from outside of the camera; and
    means responsive to the operation of said trigger means and to the characteristic output of said focusing device to produce said start signal for causing said video recorder to start the recording operation.

2. A video camera according to the claim 1, wherein said automatic focusing device is so arranged as to be activated by the actuation of said trigger means.

3. A video camera according to the claim 1, wherein said trigger means includes:
    first and second trigger switches operable in succession from outside of said camera;
    wherein said automatic focusing device is so arranged at to be activated by the actuation of said first trigger switch, and said start signal producing means is so arranged as to produce said signal in response to the actuation of said second trigger switch and to the characteristic output of said focusing device.

4. A video camera according to claim 3, further comprising:
circuit means for providing said video signal, said circuit means being so arranged as to be activated by the actuation of said first trigger switch.

5. A video camera according to the claim 1, wherein said trigger means includes:
first and second trigger switches operable in succession from outside of said camera; and said camera further comprises circuit means for providing said video signals, wherein said circuit means is so arranged as to be activated by the actuation of said first trigger switch;
said automatic focusing device is so arranged as to be activated by the actuation of said second trigger switch; and
said start signal producing means is so arranged as to produce said start signal in response to the actuation of said second trigger switch and to the characteristic output of said focusing device.

6. A video camera according to the claim 1, 2, 3, 4 or 5, further comprising:
manually operable switching means for disabling said automatic focusing device; and
control means for causing said start signal producing means to produce said start signal solely in response to the actuation of said trigger means when said focusing device is disabled by said switching means, wherein said control means is functionally linked to said switching means.

7. A video camera according to the claim 1, 2, 3, 4 or 5, further comprising:
manually operable switching means for disabling said automatic focusing device; and
auxiliary means for providing said start signal on behalf of said start signal producing means and solely in response to the actuation of said trigger means when said focusing device is disabled by said switching means, wherein said auxiliary means is functionally linked to said switching means.

8. A video camera according to the claim 1 or 2, further comprising:
an image pick-up tube for scanning an image formed by said lens system and for producing, at a predetermined stable state, image scanning signals;
detecting means for detecting whether said image pick-up tube has reached the predetermined stable state and adapted to produce a characteristic output upon detection that said stable state is reached; and
said start signal producing means is so arranged as to produce said start signal in response to the actuation of said trigger means, to the characteristic output of said automatic focusing device and to the characteristic output of said detecting means.

9. A video camera according to the claim 8, further comprising:
manually operable switching means for disabling said automatic focusing device; and
control means for causing said start signal producing means to produce said start signal in response to the actuation of said trigger means and to the characteristic output of said detecting means when said focusing device is disabled by said switching means, wherein said control means is functionally linked with said switching means.

10. A video camera according to the claim 8, further comprising:
manually operable switching means for disabling said automatic focusing device; and
auxiliary means for providing said start signal on behalf of said start signal producing means and in response to the actuation of said trigger means and to the characteristic output of said detecting means when said focusing device is disabled by said switching means, wherein said auxiliary means is functionally linked with said switching means.

11. A video recording system comprising in combination:
(A) a focus adjustable image pick-up lens system for forming a picture image of an object;
(B) an automatic focusing device for automatically focusing said lens system onto said object, said device producing an indication upon completion of focusing of the lens system;
(C) picture image signal generation means for sensing said picture image formed by said lens system and for generating picture image signals;
(D) recording means for recording said picture image signals generated by said signal generation means on a recording medium;
(E) manually operable trigger means; and
(F) control means responsive to said trigger means and to said indication produced by said focusing device to enable said recording means to record said picture signals on said recording medium.

12. A video recording system according to claim 11, wherein said automatic focusing device is arranged to be activated by the actuation of said trigger means.

13. A video recording system according to claim 11 or 12, wherein said trigger means includes:
first and second trigger switches operable in succession from outside of said camera;
wherein said automatic focusing device is arranged to be activated by the actuation of said first trigger switch, and said control means is arranged to enable said recording means in response to the actuation of said second trigger switch and to the indication produced by said focusing device.

14. A video recording system according to claim 11 or 12, further comprising:
manually operable switching means for disabling said automatic focusing device; and
change-over means for causing said control means to enable said recording means solely in response to said trigger means when said focusing device is disabled by said switching means.

15. A video recording system according to claim 11 or 12, further comprising:
manually operable switching means for disabling said automatic focusing device; and
auxiliary means for enabling said recording means on behalf of said control means solely in response to said trigger means when said focusing device is disabled by said switching means.

16. A video recording system according to claim 11 or 12, further comprising:
detecting means for detecting whether said signal generation means has reached a predetermined stable state whereat the picture image signals are generated and adapted to produce a characteristic output upon detection that said generation means has reached said stable state;
said control means being arranged to enable said recording means in response to said trigger means, to the indication produced by said automatic focusing device and to the characteristic output of said detecting means.

17. A video recording system according to the claim 16, further comprising:
manually operable switching means for disabling said automatic focusing device; and
change-over means for causing said control means to enable said recording means in response to said trigger means and to the characteristic output of said detecting means when said focusing device is disabled by said switching means.

18. A video recording system according to the claim 16, further comprising:
manually operable switching means for disabling said automatic focusing device; and
auxiliary means for enabling said recording means on behalf of said control means in response to said trigger means and to the characteristic output of said detecting means when said focusing device is disabled by said switching means.

* * * * *

UNITED STATES PATENT AND TRADEMARK OFFICE
CERTIFICATE OF CORRECTION

PATENT NO. : 4,400,743
DATED : August 23, 1983
INVENTOR(S) : HIROYUKI TAKIMOTO, ET AL.

It is certified that error appears in the above-identified patent and that said Letters Patent is hereby corrected as shown below:

Column 2, line 26, "brough" should read --brought--;

line 45, "mleans" should read --means--.

Column 8, line 63, Claim 3, "at" should read --as--.

Signed and Sealed this

Third Day of April 1984

[SEAL]

Attest:

GERALD J. MOSSINGHOFF

Attesting Officer — Commissioner of Patents and Trademarks